US009372359B2

(12) United States Patent
Nagami

(10) Patent No.: US 9,372,359 B2
(45) Date of Patent: Jun. 21, 2016

(54) LIQUID CRYSTAL DISPLAY DEVICE

(71) Applicant: Japan Display Inc., Tokyo (JP)

(72) Inventor: Takahiro Nagami, Mobara (JP)

(73) Assignee: Japan Display Inc., Tokyo (JP)

( * ) Notice: Subject to any disclaimer, the term of this patent is extended or adjusted under 35 U.S.C. 154(b) by 175 days.

(21) Appl. No.: 13/928,409

(22) Filed: Jun. 27, 2013

(65) Prior Publication Data

US 2014/0002757 A1    Jan. 2, 2014

(30) Foreign Application Priority Data

Jul. 2, 2012    (JP) .................. 2012-148484

(51) Int. Cl.
| | |
|---|---|
| G02F 1/1335 | (2006.01) |
| G02F 1/1333 | (2006.01) |
| G02F 1/13 | (2006.01) |
| G06F 3/044 | (2006.01) |
| G06F 3/041 | (2006.01) |
| G02F 1/1343 | (2006.01) |
| G02F 1/1362 | (2006.01) |

(52) U.S. Cl.
CPC .......... *G02F 1/13338* (2013.01); *G02F 1/1309* (2013.01); *G06F 3/044* (2013.01); *G06F 3/0412* (2013.01); *G02F 2001/134318* (2013.01); *G02F 2001/136263* (2013.01); *G06F 2203/04103* (2013.01)

(58) Field of Classification Search
CPC ............... G06F 3/0412; G06F 3/044; G06F 2203/04103; G02F 1/13338; G02F 1/1309; G02F 2001/134318; G02F 2001/136263
USPC ......................................... 349/12
See application file for complete search history.

(56) References Cited

U.S. PATENT DOCUMENTS

| | | | | |
|---|---|---|---|---|
| 8,289,457 | B2* | 10/2012 | Hwang et al. | 349/12 |
| 2009/0256818 | A1 | 10/2009 | Noguchi et al. | |
| 2011/0084273 | A1* | 4/2011 | Yamazaki | H01L 29/42384 257/43 |
| 2012/0113027 | A1 | 5/2012 | Song et al. | |
| 2012/0274612 | A1* | 11/2012 | Sogabe et al. | 345/204 |

FOREIGN PATENT DOCUMENTS

| | | | |
|---|---|---|---|
| JP | 2009-258182 A | 11/2009 | |
| JP | 2012-27622 | 2/2012 | |
| JP | 2012-103658 A | 5/2012 | |

OTHER PUBLICATIONS

Japanese Office Action dated Feb. 9, 2016 for corresponding Japanese Patent Application No. 2012-148484. With English Translation.

* cited by examiner

*Primary Examiner* — Nathanael R Briggs
*Assistant Examiner* — William Peterson
(74) *Attorney, Agent, or Firm* — Typha IP LLC

(57) ABSTRACT

To provide a thin liquid crystal display device equipped with the capacitance-type touch panel, and specifically the thin liquid crystal display device with a lower cost and a higher reliability.
The thin liquid crystal display device includes a CF substrate and a TFT substrate formed with a transparent electrode common line, the CF substrate having a plurality of transparent lines, the transparent electrode common line being isolated into a plurality of belt-like forms by an isolation slit, and an area where the transparent line and the transparent electrode common line constitutes an upper electrode and a lower electrode of the capacitance-type touch panel. Furthermore, there are provided a redundant slit and a disconnectable point of the metal common line.

9 Claims, 15 Drawing Sheets

127

128          128

LIQUID CRYSTAL DISPLAY DEVICE

CLAIM OF PRIORITY

The present application claims priority from Japanese patent application JP 2012-148484 filed on Jul. 2, 2012, the content of which is hereby incorporated by reference into this application.

FIELD OF THE INVENTION

The present invention relates to a liquid crystal display device equipped with a capacitance-type touch panel.

BACKGROUND ART

A liquid crystal display device equipped with a capacitance-type touch panel is disclosed in, for example, Japanese Unexamined Patent Publication No. 2012-27622. In this liquid crystal display device, a touch sensor body and a liquid crystal display body are manufactured separately and then assembled into a laminated structure.

SUMMARY OF THE INVENTION

Problem to be Solved by the Invention

The liquid crystal display device described in Japanese Unexamined Patent Publication No. 2012-27622 has an increased thickness of the entire liquid crystal display device because the touch sensor body and the liquid crystal display body are separately manufactured. Its production cost is also increased. A liquid crystal display device 130 includes, as shown in FIG. 4, a display section 132 and a drive circuit section 119. The inventors tried to incorporate a touch sensor section into the display section of the liquid crystal display device in view of reducing a film thickness and a cost of the device, and found that the prime cost reduction of the touch panel section, the cost reduction, and the film thickness reduction of the whole device can be achieved by using a transparent electrode common line (ITO film) of a TFT substrate that used to be fully formed (full surface) and the ITO film of a color filter (CF) substrate in the liquid crystal display device having an IPS-Pro (In-Plane Switching-Provectus) structure.

A general schematic plan view of the unique display panel (touch panel) conceived by the inventors is shown in FIG. 3. The transparent electrode common line 111 formed on the TFT substrate 110 is isolated in a horizontal direction by making a slit therein to form a lower electrode in a form of an about 5 mm wide belt, and the ITO film (transparent line) 151 formed on the CF substrate 150 is isolated in a vertical direction by making a slit to form an upper electrode in a form of an about 5 mm wide belt. Thus, an overlapping region (about 5 mm square) 131 of the upper electrode 151 and the lower electrode 111 can be used as a switch of the touch panel. The lower electrode 111 is connected to a metal common line 112 on the TFT substrate side. The line to the upper electrode is omitted on the drawing.

It was then forecasted that the film thickness of the liquid crystal device could be reduced by manufacturing a touch panel having a structure shown in FIG. 3 and integrating the touch panel. On the other hand, it was confirmed that a malfunction occurred to some touch panels.

It is an object of the present invention to provide a thin liquid crystal display device equipped with the capacitance-type touch panel, and specifically the thin liquid crystal display device with a lower cost and a higher reliability.

Means for Solving Problem

As an embodiment to achieve the above object, a liquid crystal display device includes a CF substrate formed with a color filter (CF) and a black matrix (BM), a TFT substrate formed with a transparent electrode common line and a pixel electrode, and a liquid crystal sealed between the CF substrate and the TFT substrate, wherein the CF substrate has a plurality of belt-like transparent lines extending in a first direction, the transparent electrode common line provided on the TFT substrate has a plurality of belt-like forms made by a plurality of isolation slits extending in a second direction perpendicular to the first direction, and as seen from a vertical direction, an area where the transparent line on the CF substrate and the transparent electrode common line on the TFT substrate overlap constitutes an upper electrode and a lower electrode of the capacitance-type touch panel, respectively.

Furthermore, a liquid crystal display device includes a CF substrate formed with a color filter and a black matrix, a TFT substrate formed with a transparent electrode common line and a metal common line connected thereto, and a liquid crystal sealed between the CF substrate and the TFT substrate, wherein the CF substrate has a plurality of belt-like transparent lines extending in a first direction, the transparent electrode common line provided on the TFT substrate has a plurality of belt-like forms made by a plurality of isolation slits extending in a second direction perpendicular to the first direction, as seen from a vertical direction, an area where the transparent line on the CF substrate and the transparent electrode common line on the TFT substrate overlap constitutes an upper electrode and a lower electrode of the capacitance-type touch panel, respectively, the metal common line is independently connected to a plurality of the transparent electrode common lines, the transparent electrode common line having the plurality of belt-like forms has a single redundant slit therein in parallel with the isolation slit and is formed with a redundant transparent electrode common line isolated thereby, and the metal common line connected to the transparent electrode common line has a redundant metal common line diverging to connect to the redundant transparent electrode common line, the redundant metal common line including a disconnectable point.

Moreover, a liquid crystal display device includes a CF substrate formed with a color filter and a black matrix, a TFT substrate formed with a transparent electrode common line and a metal common line connected thereto, and a liquid crystal sealed between the CF substrate and the TFT substrate, wherein the CF substrate has a plurality of belt-like transparent lines extending in a first direction, the transparent electrode common line provided on the TFT substrate has a plurality of belt-like forms made by a plurality of isolation slits extending in a second direction perpendicular to the first direction, as seen from a vertical direction, an area where the transparent line on the CF substrate and the transparent electrode common line on the TFT substrate overlap constitutes an upper electrode and a lower electrode of the capacitance-type touch panel, respectively, the metal common line is independently connected to a plurality of the transparent electrode common lines, the transparent electrode common line having the plurality of belt-like forms has a single redundant slit therein in parallel with the isolation slit and is formed with a redundant transparent electrode common line isolated thereby, and the metal common line has a redundant metal common line therein connected to the redundant transparent electrode common line, the metal common line and the redundant metal common line being connected by a switch.

Effect of the Invention

According to the invention, it is possible to provide a thin liquid crystal display device equipped with the capacitance-type touch panel, and specifically the thin liquid crystal display device with a lower cost and a higher reliability.

BEST MODE FOR CARRYING OUT THE INVENTION

Figure 3:
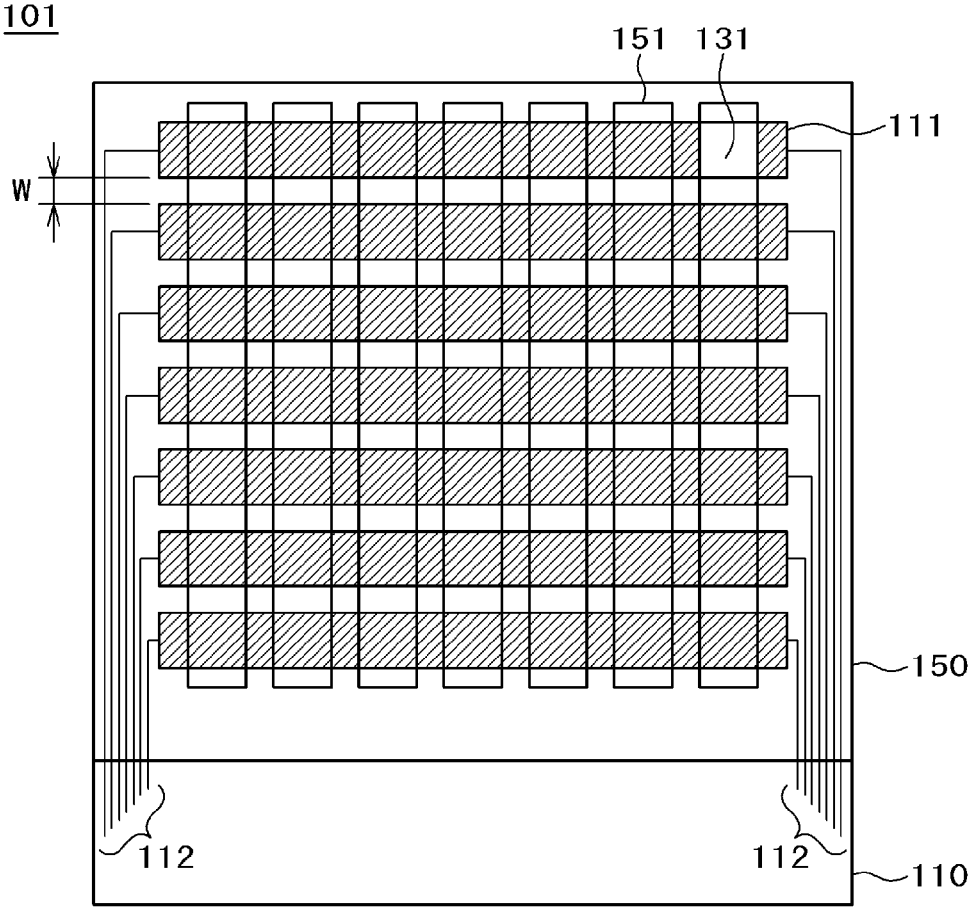
FIG. 3 is a schematic plan view of the display panel (touch panel) of the liquid crystal display device according to consideration by the inventors.

A research for a cause of a defect with a touch panel showed that a transparent electrode common line was not completely isolated. That is, with a display panel (touch panel) shown in FIG. 3, while an ITO film on a CF substrate side can be isolated at any location, a location or a width W of a slit that isolates the transparent electrode common line cannot be set as desired because a pixel region is formed on a TFT substrate side. Constraints on the location and the width of the slit in the pixel portion will be explained below with reference to FIG. 5.

Figure 5:
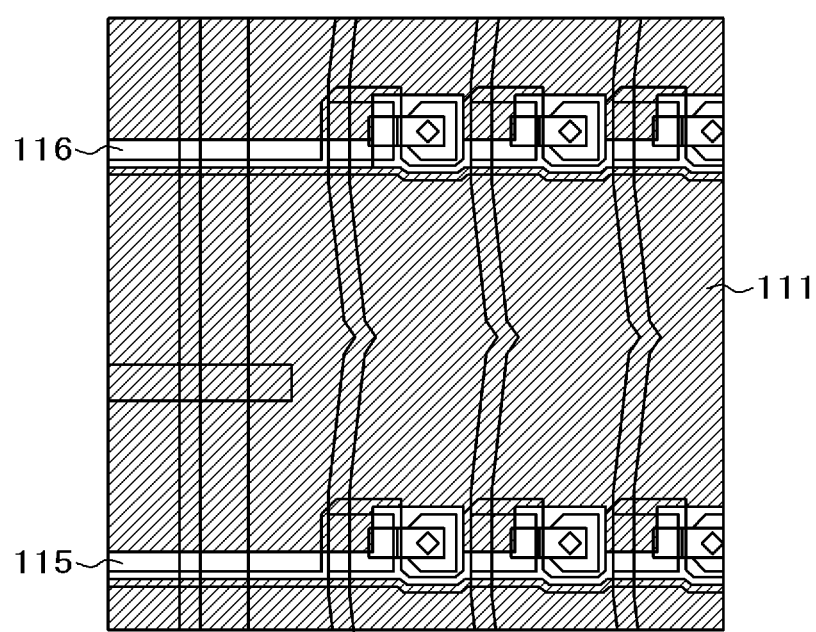
FIG. 5 is a schematic plan view of a pixel portion for illustrating an isolation region of a transparent electrode common line in the liquid crystal display device according to the first embodiment of the invention.

FIG. 5 is a schematic plan view of the pixel portion on the TFT substrate for illustrating an isolation region of the transparent electrode common line in the liquid crystal display device. Pixel electrodes are omitted in this figure. The isolation slit (void portion) 115 is provided along a TFT gate line (scan line) formation region (on the CF substrate, a region where a black matrix (BM) is formed) of each pixel skirting a display region. The width W of the isolation slit 115 may be approximately 3 to 10 μm. The isolation slit 115 is located at a position of an integral multiple of a single inter-pixel distance (20 to 200 μm).

It was found that the isolation slit 115 had a length as large as a few centimeters, and that, due to the difficulty of machining the ITO, only a few μm width of the slit was not necessarily sufficient to isolate the transparent electrode common line 111 and therefore, if the isolation between adjacent transparent electrode common lines was insufficient, it could not correctly operate as a touch panel switch, resulting in a defect. With this in mind, the inventors further considered a method of saving the defective touch panel switch (lower electrode), and conceived that a short circuit between the transparent electrode common lines desired to isolate can be saved by providing a redundant structure, i.e., a redundant slit 116 adjacent to the slit 115 (with a space of one pixel in between) for isolating the transparent electrode common line. It should be noted that the redundant slit also has constraints on its location and width, like the isolation slit.

Embodiments of the present invention will be described below. Note that an identical reference numeral refers to an identical component.

First Embodiment

Figure 1:
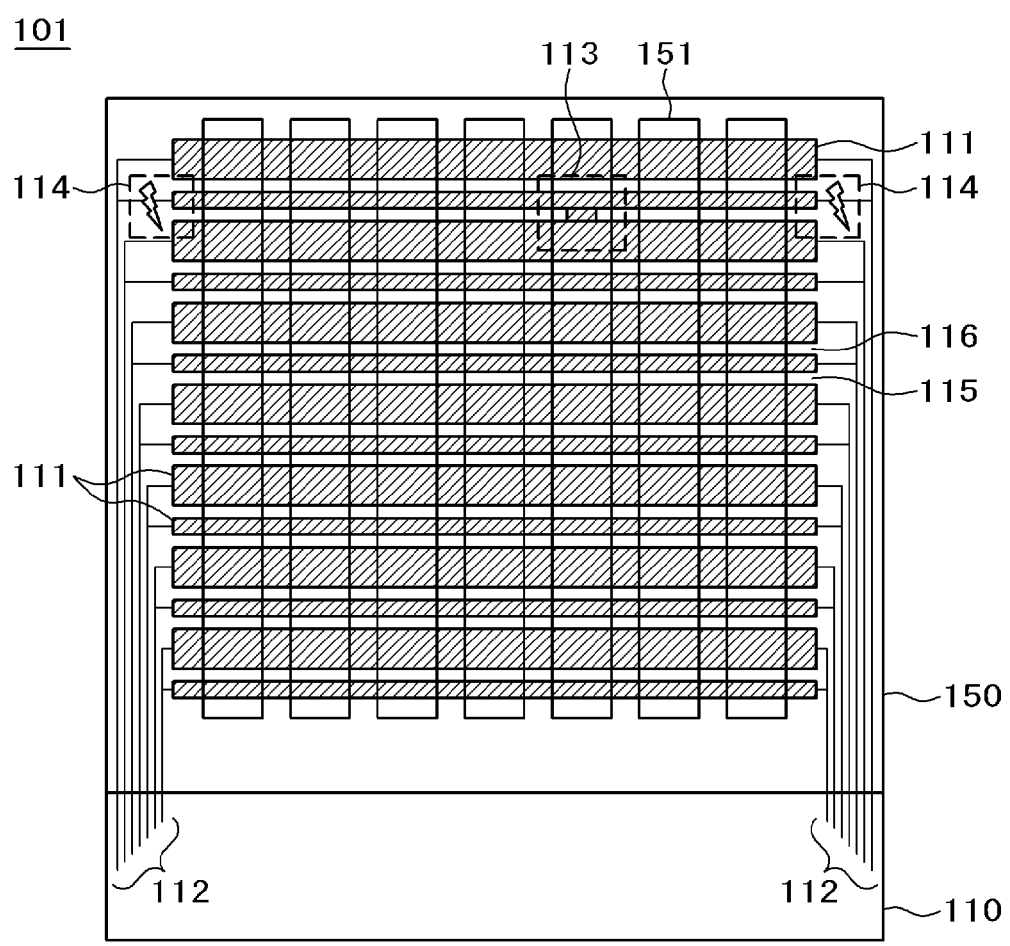
FIG. 1 is a schematic plan view of a display panel (touch panel) of a liquid crystal display device according to a first embodiment of the present invention.

A first embodiment of the present invention will be described with reference to drawings. FIG. 1 is a schematic plan view of a display panel (touch panel) 101 of a liquid crystal display device according to the first embodiment. The general configuration is same as that shown in FIG. 3 except that the redundant slit 116 is provided adjacent to the isolation slit 115 (with a space of one pixel in between) for isolating the transparent electrode common line 111 and that the redundant transparent electrode common line 111 isolated by the redundant slit 116 is electrically connected by a metal common line 112. Although the redundant slit 116 is isolated by the space of one pixel in this embodiment, the size of the space may be for two pixels or more. However, one pixel is preferable. In such a configuration, if the redundant transparent electrode common line on the first row has a short circuit 113 in between with an adjacent transparent electrode common line on the second row not connected by the metal common line 112, the metal common line connected to the redundant transparent electrode common line 111 on the first row isolated by the redundant slit 116 is cut at a disconnectable point 114. Thus, the redundant transparent electrode common line on the first row that was isolated by the redundant slit 116 and connected to the transparent electrode common line on the first row by the metal common line 112 is electrically isolated from the transparent electrode common line on the first row. The isolated redundant transparent electrode common line on the first row is short-circuited by the transparent electrode common line on the second row, and functions as an electrode for a touch panel switch on the second row. This can reduce the defective rate to approximately ¹⁄₁₀ compared with the configuration shown in FIG. 3.

Figure 2:
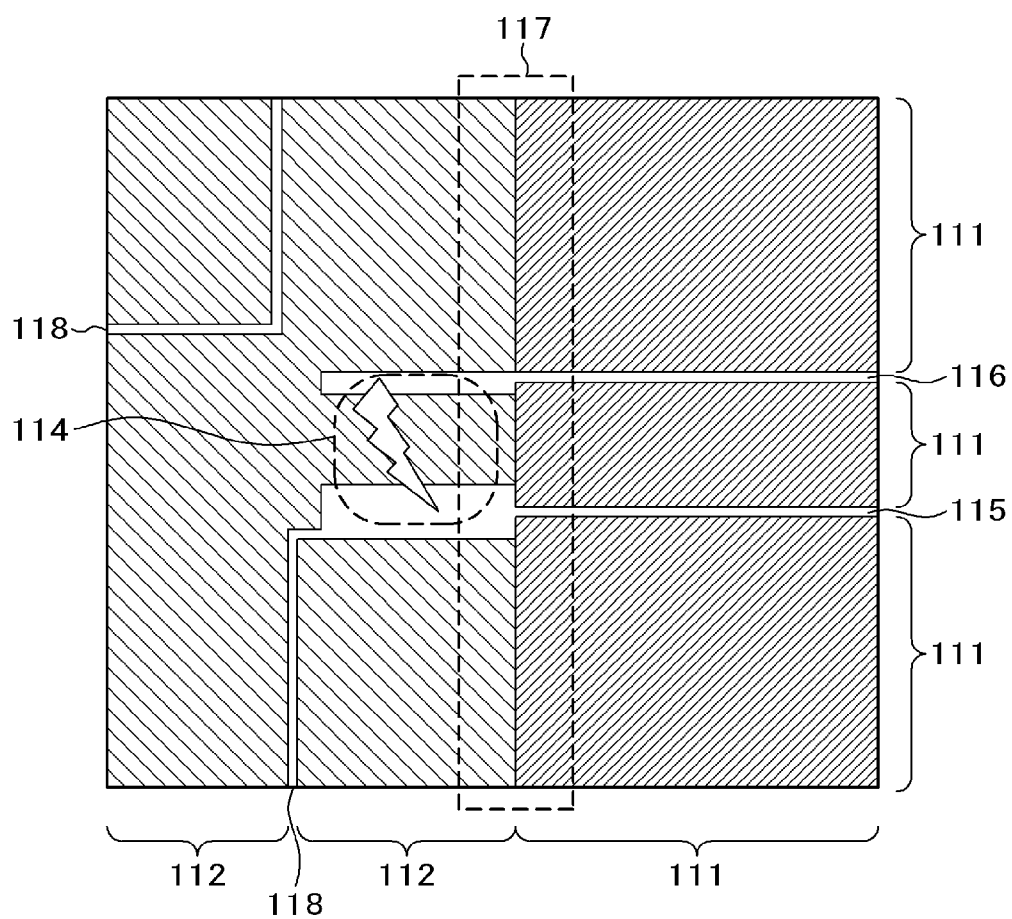
FIG. 2 is a schematic plan view of a main section of the touch panel shown in FIG. 1.

The configuration of the disconnectable point 114 of the metal common line is now described with reference to FIG. 2. FIG. 2 is a plan view illustrating a general configuration near a connection point 117 between the transparent electrode common line 111 and the metal common line 112 on the display panel (touch panel) shown in FIG. 1. The metal common line is electrically isolated by a slit 118. The metal common line (redundant metal common line) connected to the redundant transparent electrode common line isolated by the isolation slit 115 and the redundant slit 116 has a configuration of being sandwiched by wide slits at the base of the connection point 117 of these lines. By increasing the width of the slits on both sides of the redundant metal common line connected to the redundant transparent electrode common line, the redundant metal common line can be cut using a laser or the like. The area where the wide slit is formed is used as the disconnectable point 114 of the redundant metal common line connected to the redundant transparent electrode common line. Although the disconnectable point does not need to be the base of the connection point between the redundant metal common line connected to the redundant transparent electrode common line and the redundant transparent electrode common line, the base of the connection point is preferable in view of keeping the space. A preferable slit width at the metal common line disconnectable point near the connection point 117 may be 10 to 100 μm. Too small a width may allow a damage to a metal common line in the vicinity when the metal common line is cut. Too large a width is not preferable because it narrows the metal common line, thereby increasing a resistance.

Figure 6A:
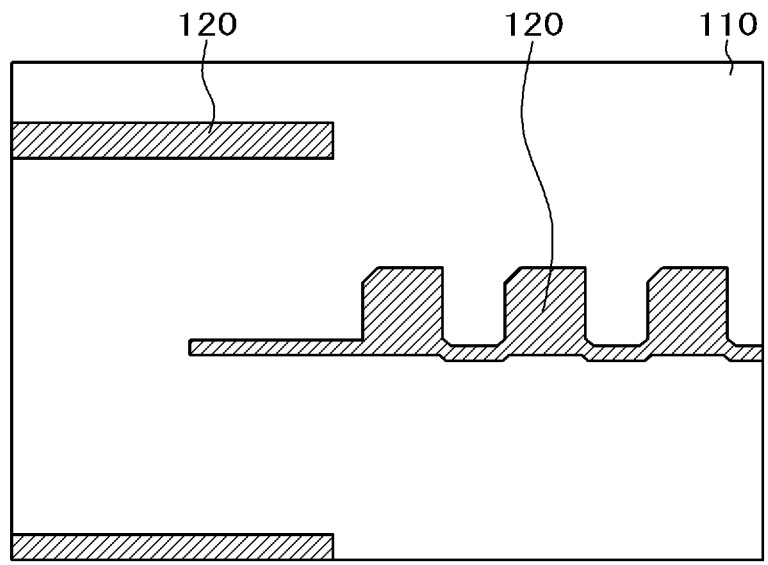
FIG. 6A is a schematic plan view of a TFT substrate for explaining a manufacturing step (gate electrode formation) of the pixel portion in the liquid crystal display device according to the consideration by the inventors and also according to the first embodiment.
Figure 6B:
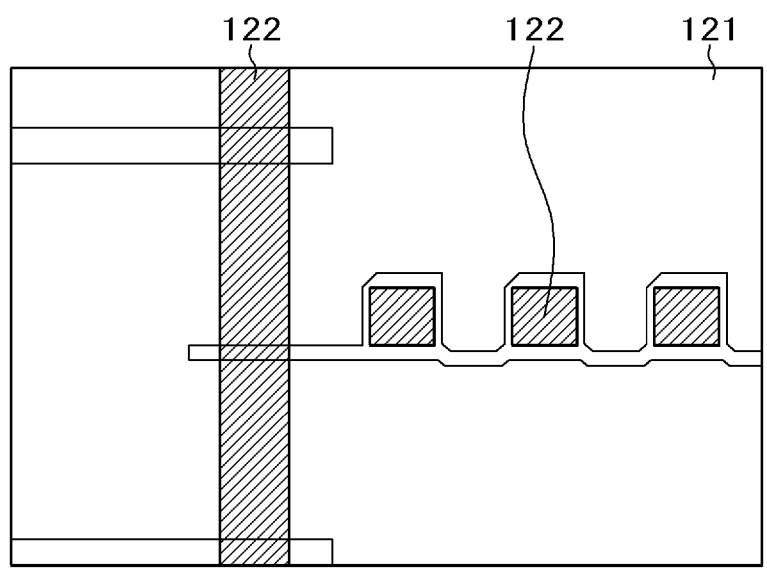
FIG. 6B is a schematic plan view of the TFT substrate for explaining the manufacturing step (gate insulating film and channel layer formation) of the pixel portion in the liquid crystal display device according to the consideration by the inventors and also according to the first embodiment.

Next, a method of manufacturing the liquid crystal display device, especially its liquid crystal display panel section, is described with reference to FIGS. 6A to 10B. FIGS. 6A to 6G are schematic plan views of the TFT substrate for explaining the manufacturing steps of the pixel portion in the liquid crystal display device according to the embodiment. First, a G metal film (scan line and gate electrode) 120 is formed on the TFT substrate (glass substrate) 110 (FIG. 6A). After forming a silicon nitride film (gate insulating film) 121 on the whole surface, an amorphous silicon film (a-Si, semiconductor layer forming a TFT channel portion) on top of the G metal film 120 via the silicon nitride film (SiN film) (FIG. 6B).

Figure 6C:
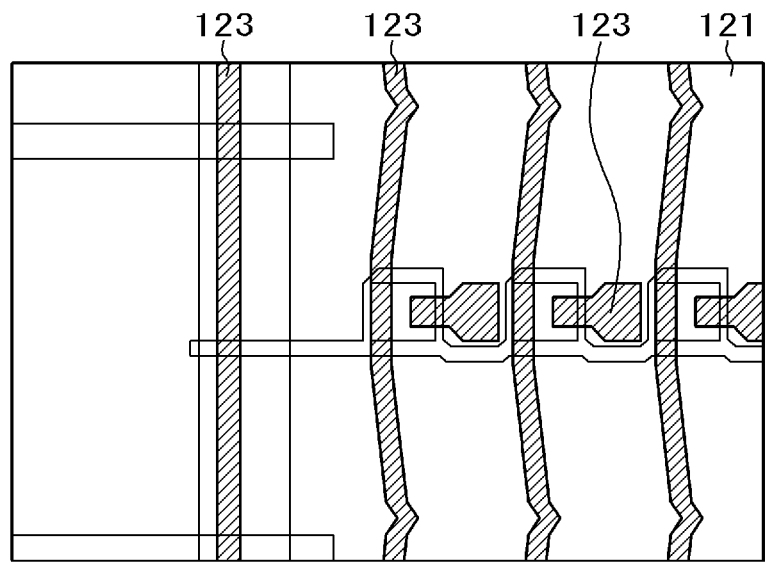
FIG. 6C is a schematic plan view of the TFT substrate for explaining the manufacturing step (source-drain layer formation) of the pixel portion in the liquid crystal display device according to the consideration by the inventors and also according to the first embodiment.
Figure 6D:
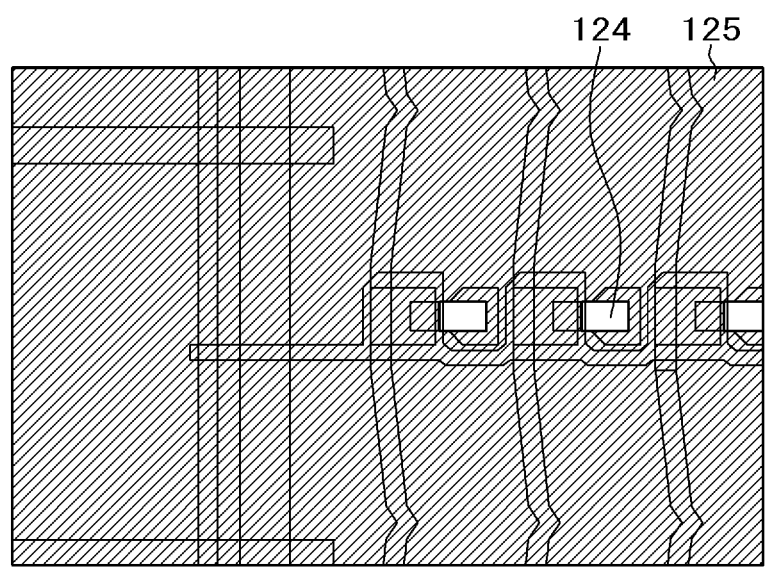
FIG. 6D is a schematic plan view of the TFT substrate for explaining the manufacturing step (lower-layer inorganic passivation film and organic passivation film formation) of the pixel portion in the liquid crystal display device according to the consideration by the inventors and also according to the first embodiment.
Figure 6E:
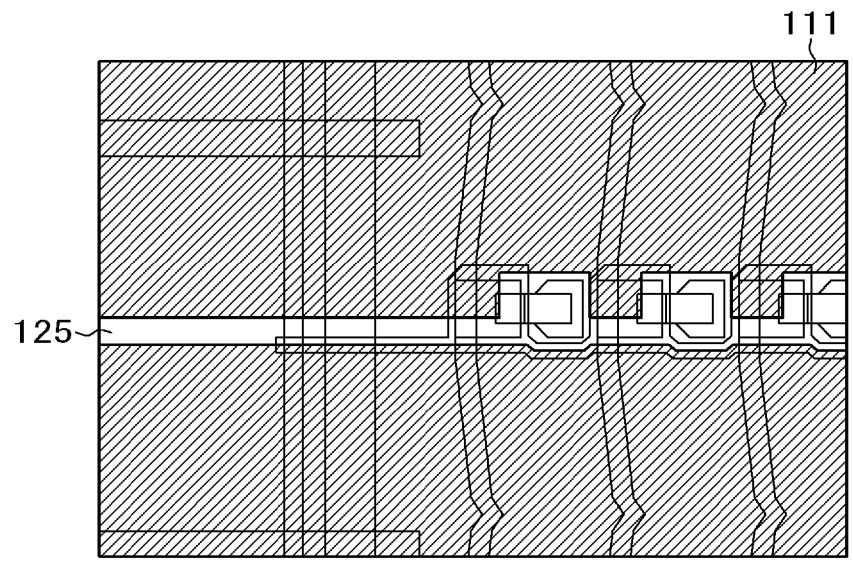
FIG. 6E is a schematic plan view of the TFT substrate for explaining the manufacturing step (transparent electrode common line formation) of the pixel portion in the liquid crystal display device according to the consideration by the inventors and also according to the first embodiment.

Subsequently, an SD metal film (source electrode and image signal line and drain electrode or the like) 123 is formed on the amorphous silicon film (FIG. 6C). After forming a passivation film (PAS, lower inorganic passivation film) 124 on the whole surface, an organic passivation film (FPAS) 125 with an opening on top of the source electrode is formed (FIG. 6D). The opening exposes the lower inorganic passivation film 124. Subsequently, the transparent electrode common line 111 having a slightly larger opening and a slit portion including the opening in the organic passivation film is formed (FIG. 6E). This slit portion has a width of 3 to 10 μm, and is used as a slit for isolating the transparent electrode common line into the lower electrode of the touch panel, or a redundant slit. The opening and the slit portion can be formed using lithography and etching. The opening exposes the lower inorganic passivation film 124 and the organic passivation film 125, and the slit portion exposes the organic passivation film 125.

Figure 6F:
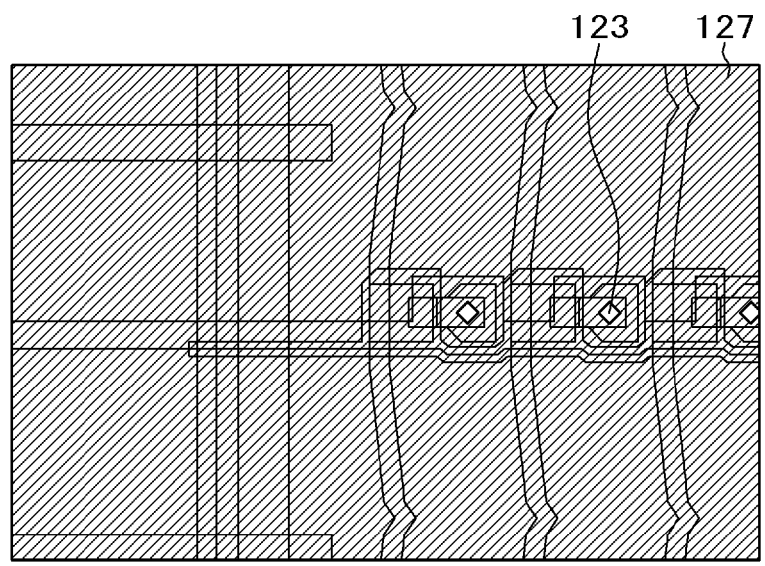
FIG. 6F is a schematic plan view of the TFT substrate for explaining the manufacturing step (upper-layer inorganic passivation film formation) of the pixel portion in the liquid crystal display device according to the consideration by the inventors and also according to the first embodiment.

Subsequently, after forming an upper inorganic passivation film (UPS) 127 on the whole surface, a through-hole for exposing the source electrode 123 is formed in the laminated film of the lower inorganic passivation film 124 and the upper inorganic passivation film (UPS) 127 (FIG. 6F). Thereafter, the ITO film (pixel electrode) is formed that is connected to the source electrode 123 via the through-hole provided in the laminated film of the lower inorganic passivation film (PAS) 124 and the upper inorganic passivation film (UPS) 127 (FIG. 6G).

With the manufacturing method described above, the lower electrode of the touch panel can be manufactured without increasing the number of steps only by changing a mask for forming the slit portion in the transparent electrode common line.

Figure 6G:
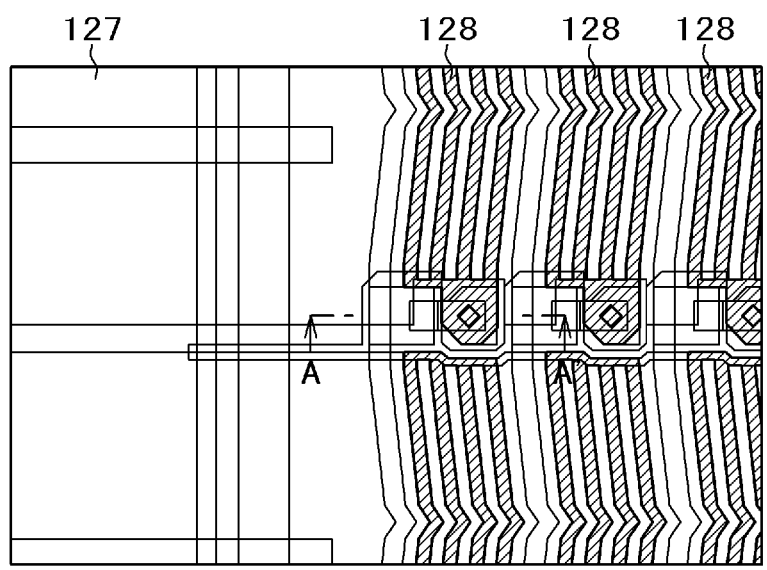
FIG. 6G is a schematic plan view of the TFT substrate for explaining the manufacturing step (pixel ITO electrode formation) of the pixel portion in the liquid crystal display device according to the consideration by the inventors and also according to the first embodiment.
Figure 7:
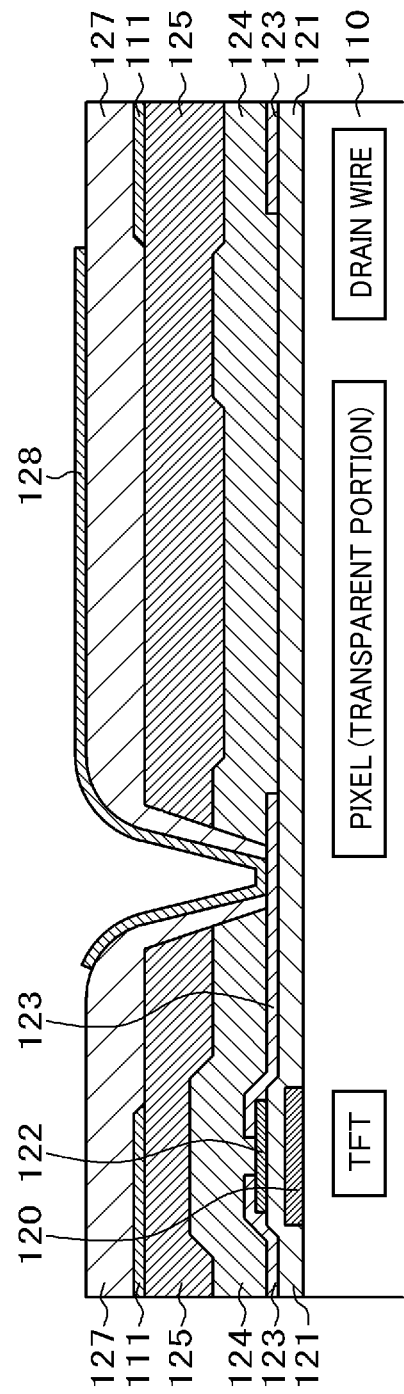
FIG. 7 is a schematic cross-sectional view along A-A' in FIG. 6G.

A cross-sectional view along A-A' in FIG. 6G is shown in FIG. 7. No effect by forming the slit in the transparent electrode common line is seen in the cross section structure, resulting in no adverse effect on the electrical property of the TFT. Unlike the TFT substrate, the upper electrode using the ITO film of the touch panel formed on the CF substrate does not have any constraint on its manufacture, and it can be isolated at any location. This can be manufactured by a known method, details of which method is not explained here, and the width of the isolation slit is preferably 10 µm to 100 µm. A residue may be left after removal of the ITO film with 10 µm or smaller width, and 100 µm or larger width is not preferable because an upper electrode region of the switch section of the touch panel is reduced.

Next, a manufacturing steps and a cross section structure of the vicinity of the connection point between the transparent electrode common line and the metal common line are described with reference to FIG. 8, FIGS. 8A to 8G, and FIG. 9.

Figure 8:
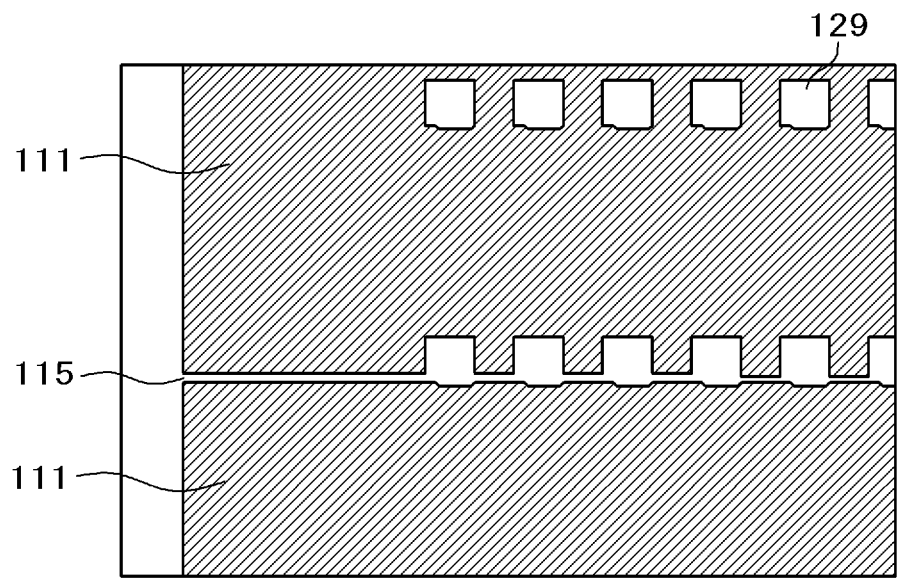
FIG. 8 is a schematic plan view of a transparent electrode common line pattern (vicinity of connection point) in the liquid crystal display device according to the consideration by the inventors and also according to the first embodiment.

FIG. 8 is a plan view of a transparent electrode common line pattern (vicinity of connection point). The transparent electrode common line pattern has an opening 129 and a slit portion (the isolation slit 115 is illustrate here) for connecting the source electrode and the pixel electrode. Given below is an explanation about a manufacturing method of the connection point between the transparent electrode common line and the metal common line is described below with reference to the drawings of the vicinity of this pattern.

Figure 8A:
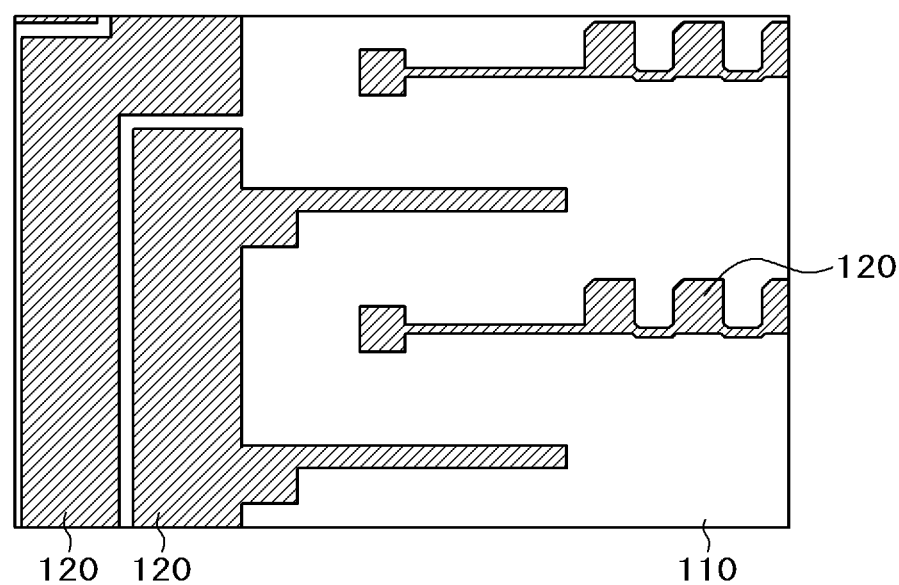
FIG. 8A is a schematic plan view of the TFT substrate for explaining the manufacturing step (transparent electrode common line, gate electrode formation) of a transparent electrode common line connection point in the liquid crystal display device according to the consideration by the inventors and also according to the first embodiment.
Figure 8B:
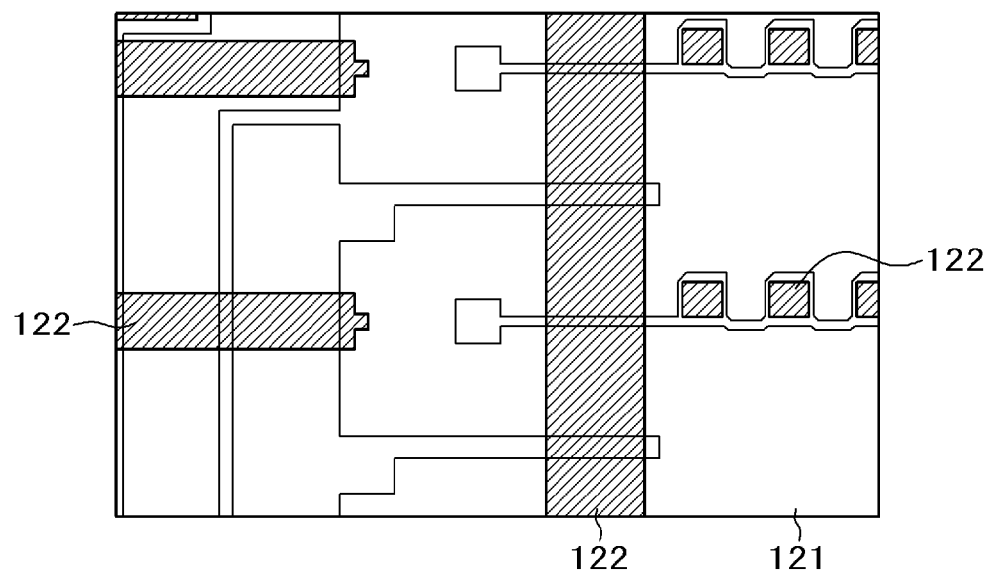
FIG. 8B is a schematic plan view of the TFT substrate for explaining the manufacturing step (insulating film and channel layer formation) of the transparent electrode common line connection point in the liquid crystal display device according to the consideration by the inventors and also according to the first embodiment.

First, the G metal film (a metal film serving as the metal common line, the scan line, the gate electrode, and the like) 120 is formed on the TFT substrate (glass substrate) 110 (FIG. 8A). After forming the silicon nitride film (an insulating film serving as the inorganic insulating film, the gate insulating film, and the like) 121 on the whole surface, the amorphous silicon film (a-Si film: a semiconductor film serving as the channel portion, a local line and the like of the TFT) 122 is formed on top of the G metal film 120 via the silicon nitride film (FIG. 8B).

Figure 8C:
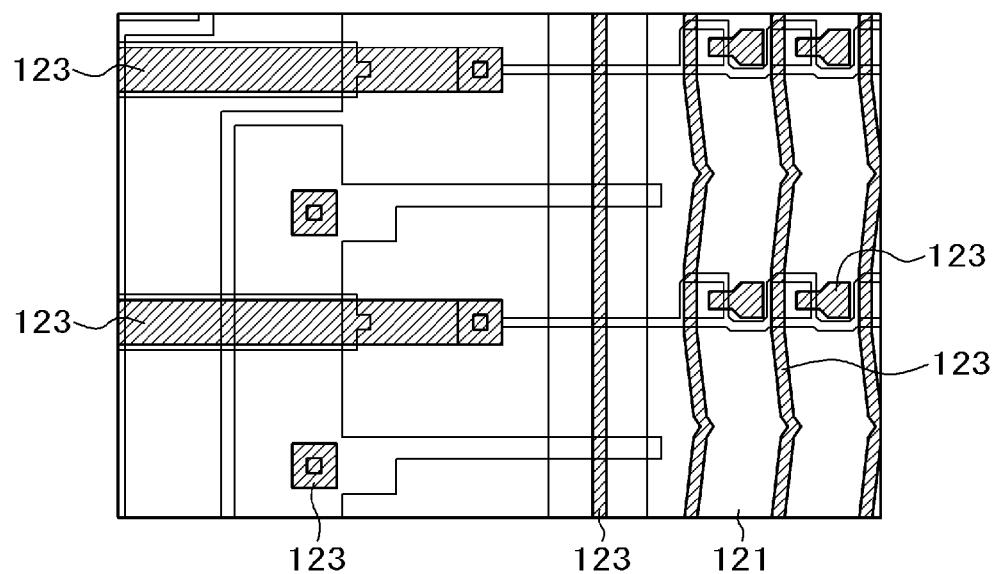
FIG. 8C is a schematic plan view of the TFT substrate for explaining the manufacturing step (opening formation for metal common line contact, source-drain layer formation) of the transparent electrode common line connection point in the liquid crystal display device according to the consideration by the inventors and also according to the first embodiment.
Figure 8D:
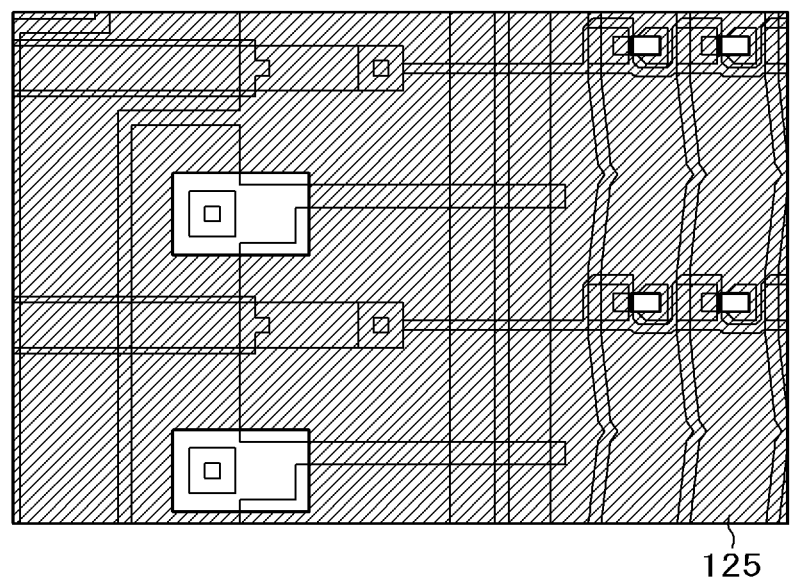
FIG. 8D is a schematic plan view of the TFT substrate for explaining the manufacturing step (lower-layer inorganic passivation film and organic passivation film formation) of the transparent electrode common line connection point in the liquid crystal display device according to the consideration by the inventors and also according to the first embodiment.
Figure 8E:
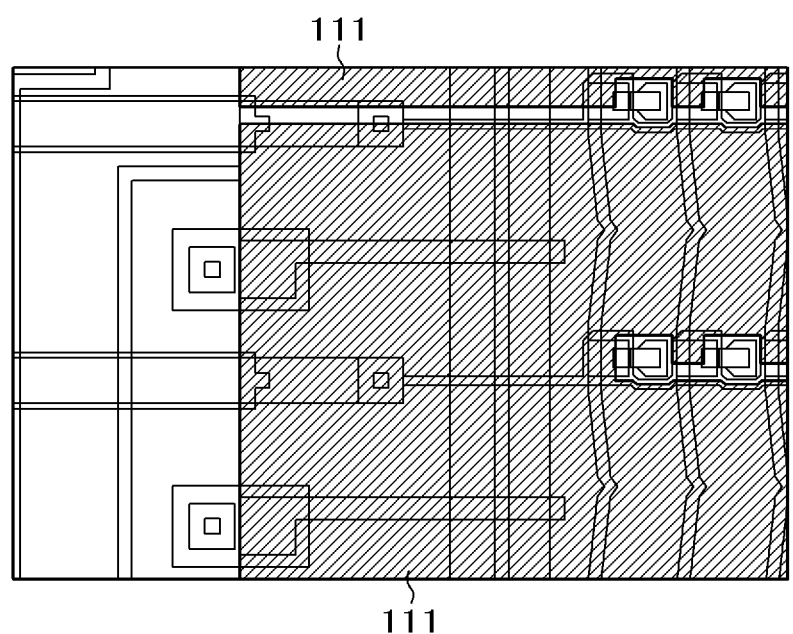
FIG. 8E is a schematic plan view of the TFT substrate for explaining the manufacturing step (transparent electrode common line formation) of the transparent electrode common line connection point in the liquid crystal display device according to the consideration by the inventors and also according to the first embodiment.

Subsequently, after forming the through-hole (GTH) in the inorganic insulating film 121 on top of the G metal film to be the metal common line and exposing the G metal film to be the metal common line, the SD metal film 123 to be the source electrode, image signal line, the drain electrode and the like is formed on the G metal film to be the exposed metal common line and the amorphous silicon film (FIG. 8C). After forming the G metal layer inorganic passivation film (PAS) 124 on the whole surface, the organic passivation film (FPAS) 125 having the through-hole (GTH) to the G metal film to be the metal common line and the opening on top of the source electrode is formed (FIG. 8D). The opening exposes the lower inorganic passivation film. Subsequently, the transparent electrode common line 111 having a slightly larger opening and the slit portion including the opening on top of the G metal film to be the metal common line and in the organic passivation film is formed (FIG. 8E). This slit portion has the width of 3 to 10 and is used as the slit for isolating the transparent electrode common line into the lower electrode of the touch panel, or the redundant slit. The opening and the slit portion can be formed using lithography and etching. The slit portion exposes the organic passivation film 125, and the opening exposes the lower inorganic passivation film and the organic passivation film arranged around it.

Figure 8F:
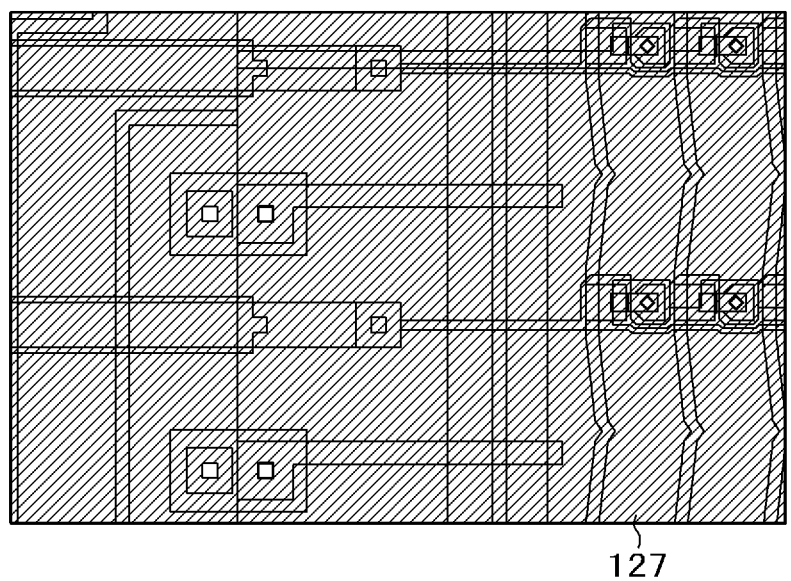
FIG. 8F is a schematic plan view of the TFT substrate for explaining the manufacturing step (upper-layer inorganic passivation film formation) of the transparent electrode common line connection point in the liquid crystal display device according to the consideration by the inventors and also according to the first embodiment.

Subsequently, after forming the upper inorganic passivation film (UPS) 127 on the whole surface, the through-hole for exposing the SD metal film 123 formed on the G metal film to be the metal common line via the through-hole, the source electrode, and the transparent electrode common line is formed in the laminated film of the lower inorganic passivation film (PAS) 124 and the upper inorganic passivation film (UPS) 127 (FIG. 8F). Thereafter, the ITO film (pixel electrode) is formed that is connected to the source electrode 123 via the through-hole provided in the laminated film of the lower inorganic passivation film (PAS) 124 and the upper inorganic passivation film (UPS) 127, and the G metal film to be the metal common line and the transparent electrode common line are connected by the ITO film on the same layer (FIG. 8).

According to the manufacturing method described above, the lower electrode of the touch panel can be manufactured without changing the number of the steps only by changing a mask pattern of the metal common line corresponding to the isolated transparent electrode common line in the connection point between the transparent electrode common line and the metal common line of the TFT substrate and also by changing the slit width in the disconnectable point of the metal common line in the pattern.

Figure 8G:
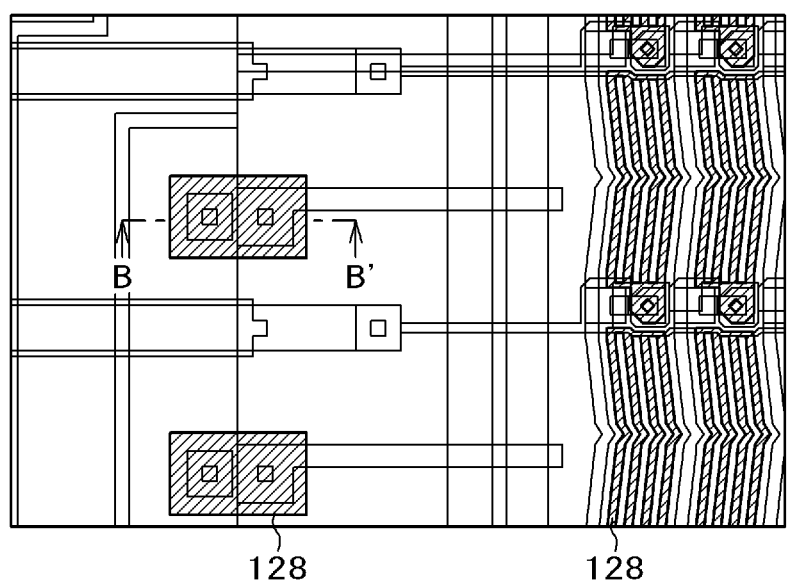
FIG. 8G is a schematic plan view of the TFT substrate for explaining the manufacturing step (ITO electrode formation) of the transparent electrode common line connection point in the liquid crystal display device according to the consideration by the inventors and also according to the first embodiment.
Figure 9:
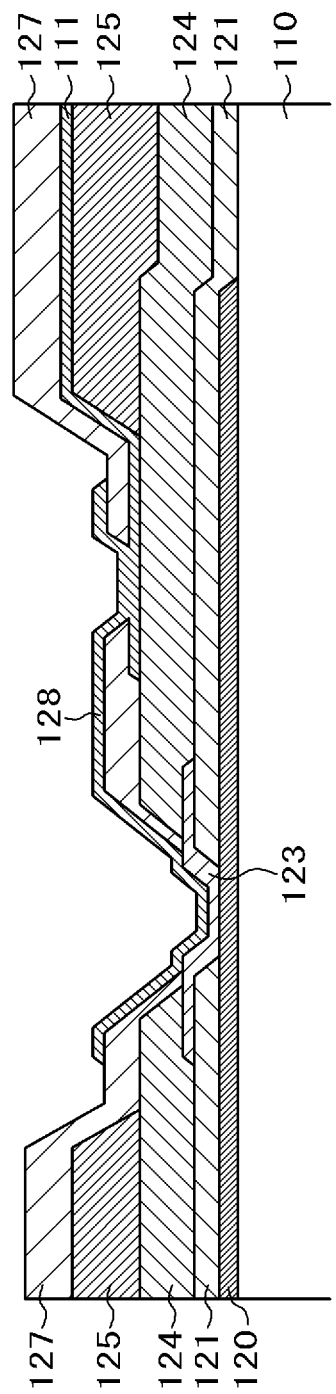
FIG. 9 is a schematic cross-sectional view along B-B' in FIG. 8G.

A cross-sectional view along B-B' in FIG. 8G is shown in FIG. 9. In the pixel portion, the transparent electrode common line 111 is connected to the metal common line (G metal film) via the SD metal film 123 by the ITO film 128 to be the pixel electrode. No effect by forming the slit in the transparent electrode common line 111 is seen in the cross section structure, resulting in no adverse effect on the electrical property of the TFT.

Figure 10A:
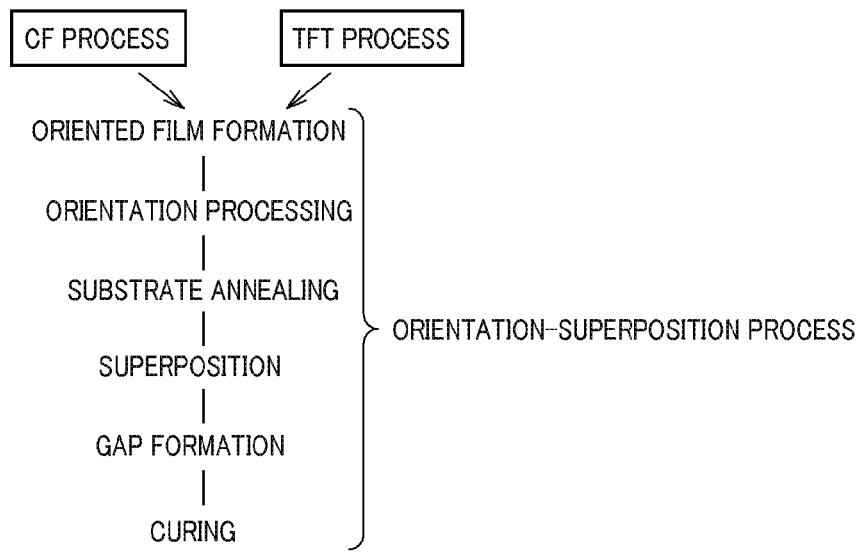
FIG. 10A is a flow chart for explaining the process of manufacturing the liquid crystal display device according to the consideration by the inventors and also according to the first embodiment from an oriented film formation step to a step of superposing a CF substrate and the TFT substrate.

Next, an assembling procedure of the CF substrate and the TFT substrate of the liquid crystal display device having the touch panel is explained using FIG. 10A. FIG. 10A is a flow chart for explaining the process of manufacturing the liquid crystal display device according to the embodiment from an oriented film formation step to a step of superposing the CF substrate and the TFT substrate. First, the CF substrate having completed a color filter formation step and the TFT substrate having completed a TFT formation step, the TFT including the pixel region, are prepared. An upper oriented film is formed on the CF substrate and a lower oriented film is formed on the TFT substrate, followed by orientation processing and annealing of the substrates. The CF substrate with its upper oriented film facing up is superposed with the TFT substrate with its lower oriented film facing down, a gap is formed to encapsulate the liquid crystal between the substrates, and the gap is fixed by curing.

Figure 10B:
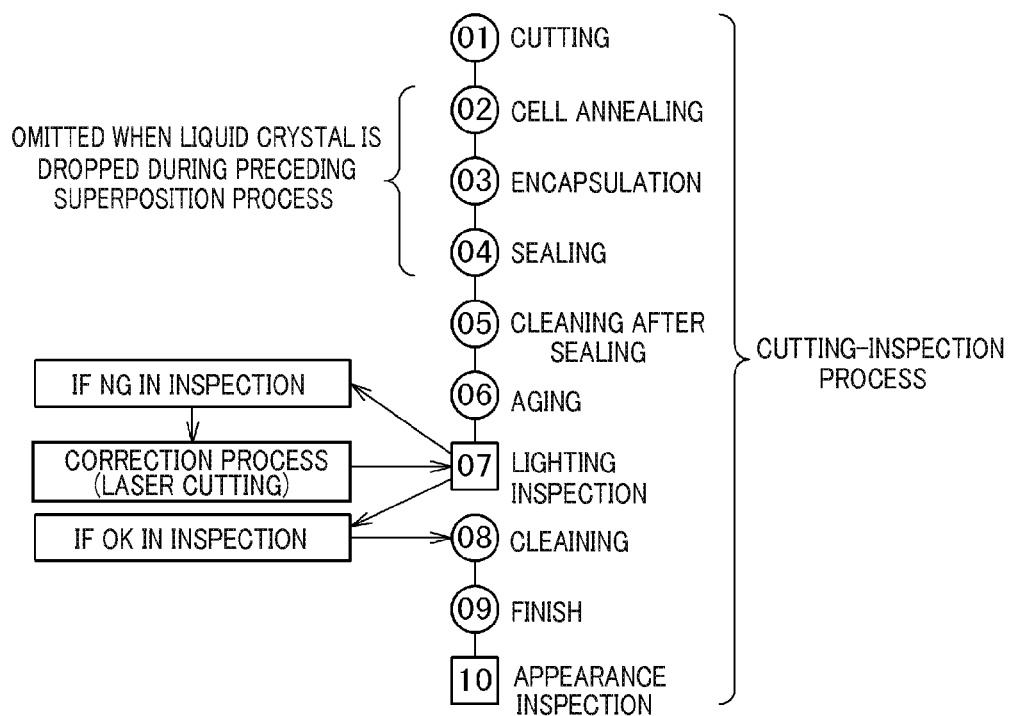
FIG. 10B is a flow chart for explaining the process of manufacturing the liquid crystal display device according to the consideration by the inventors and also according to the first embodiment from the step of superposing the CF substrate and the TFT substrate to an appearance inspection step.

Next, a procedure of inspecting and saving defectives of the liquid crystal display device having the touch panel is explained using FIG. 10B. FIG. 10B is a flow chart for explaining the process of manufacturing the liquid crystal display device according to the embodiment from the step of superposing the CF substrate and the TFT substrate to an appearance inspection step. First, the superposed CF substrate and TFT substrate are cut into each cell and annealed. The liquid crystal is encapsulated in the gap between the CF substrate and the TFT substrate and sealed therein. In case where the liquid crystal is dropped in the preceding step of superposing the CF substrate and the TFT substrate, the steps of annealing and sealing the cells are not required. Then, after cleaning and aging the cells, a lighting inspection is performed. If the device passes the lighting inspection (OK), after cleaning and finishing steps, an appearance inspection is performed. If the device fails the lighting inspection (NG), a correction step is performed. Specifically, the redundant metal common line connected to the redundant transparent electrode common line having a defectively machined portion (short circuited portion) of the transparent electrode common line is cut at its disconnectable point using the laser or the like, and the lighting inspection is performed again. If the device passes the inspection, the process proceeds to the next step. If the device fails the inspection, the correction step is performed again. Although not shown in the drawing, the number of times to perform the correction step may be predetermined, and if the predetermined number is exceeded, the device may be given up for the correction and discarded.

Figure 4:
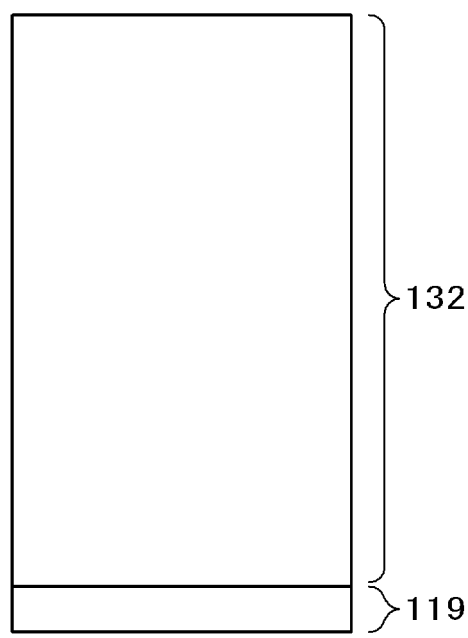
FIG. 4 is a general schematic plan view of the liquid crystal display device according to the consideration by the inventors and also according to the first embodiment.

The liquid crystal display device 130 as shown in FIG. 4 having the redundant slit was manufactured using the manufacturing method described above, and it was found that, by performing the correction step, the defective rate could be reduced to 1/10 or less compared to the case of not performing the correction step, thereby improving the reliability. Furthermore, compared with a liquid crystal display device in which the touch panel section is isolated from the liquid crystal display section, the thickness and the cost was reduced.

As described above, the embodiment can provide the thin liquid crystal display device equipped with the capacitance-type touch panel, and specifically the thin liquid crystal display device with the lower cost and the higher reliability.

Second Embodiment

A second embodiment of the present invention will be described below. Those described in the first embodiment but not in this embodiment can be applied to this embodiment unless there are special circumstances. In the first embodiment, when the transparent electrode common line short-circuits with an electrically isolated adjacent redundant transparent electrode common line, it is electrically isolated by cutting the corresponding metal common line at the disconnectable point of the redundant metal line to which the corresponding redundant transparent electrode common line is connected. In the present embodiment, the redundant metal common line connected to the redundant transparent electrode common line is isolated from the metal common line (main metal common line), and the main metal line is connected to the redundant metal common line by a switch. If a defect is found in the lighting inspection, the redundant metal common line connected to the short-circuited redundant transparent electrode common line is switched. This can electrically isolate the short-circuited redundant transparent electrode common line to be saved as a good article. The TFT can be used as the switch.

By manufacturing the liquid crystal display device 130 as shown in FIG. 4 and switching the redundant metal common line with respect to the liquid crystal display device that failed the lighting inspection, the defective rate was reduced to 1/10 compared with the configuration before switching, thereby improving the reliability. Furthermore, compared with the liquid crystal display device in which the touch panel section is isolated from the liquid crystal display section, the thickness and the cost was reduced.

As described above, the embodiment can provide the thin liquid crystal display device equipped with the capacitance-type touch panel, and specifically the thin liquid crystal display device with the lower cost and the higher reliability.

The present invention is not limited to the above embodiment, but includes various modifications. For example, the above embodiments are described in detail to comprehensively explain the present invention, and it should not necessarily be limited to include all the elements described herein. Furthermore, it is possible to replace a part of a configuration of one embodiment with the configuration of another embodiment, and it is also possible to add a configuration of one embodiment to a configuration of another embodiment. Moreover, a part of a configuration of each embodiment may be provided with an additional configuration, eliminated, or replaced.

What is claimed is:

1. A display device comprising:
   a first substrate including first electrodes extending in a first direction, and
   a second substrate including a first transparent electrode, a first metal wiring connected to the first transparent electrode, a second transparent electrode, a second metal wiring connected to the second transparent electrode, and scanning lines,
   wherein the first transparent electrode and the second transparent electrode extend in a second direction perpendicular to the first direction and overlap with the plurality of first electrodes,
   wherein the first metal wiring is electrically connected to the second metal wiring, and
   wherein a plurality of scanning lines is overlapped by the first and second transparent electrodes, and a number of the plurality of scanning lines which are overlapped with the first transparent electrode is greater than a number of scanning lines that are overlapped with the second transparent electrode.

2. The display device according to claim 1, wherein a width of the first transparent electrode in the first direction is larger than a width of the second transparent electrode.

3. The display device according to claim 2, wherein an isolation slit is disposed between the first transparent electrode and the second transparent electrode, and the isolation slit extends in the second direction and overlaps with a light shielding layer of the first substrate.

4. The display device according to claim 2, wherein an isolation slit is disposed between the first transparent electrode and the second transparent electrode, and the isolation slit is arranged along one of the scan lines.

5. The display device according to claim 4, wherein the isolation slit has a width of 3 to 10 μm.

6. The display device according to claim 1, further comprises pixel electrodes which are disposed between the first transparent electrode and the first substrate.

7. The display device according to claim 6, further comprises liquid crystal layer disposed between the first substrate and the second substrate.

8. The display device according to claim 6, wherein the second transparent electrode is disposed between the first transparent electrode and the first substrate.

9. The display device according to claim 6, wherein the first transparent electrode and the second electrode are common electrodes.

* * * * *